June 23, 1970 G. U. KALMAN 3,517,200
IMAGE CONVERSION SYSTEM
Filed Feb. 3, 1967
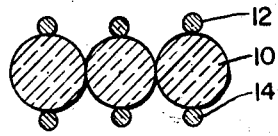
FIG. 1
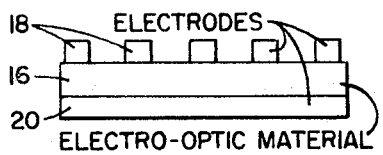
FIG. 2
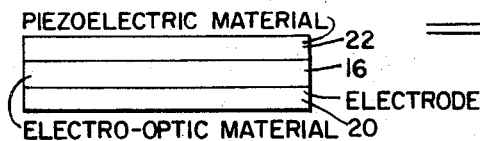
FIG. 3
FIG. 4
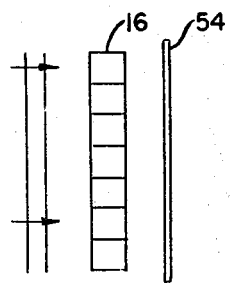
FIG. 8
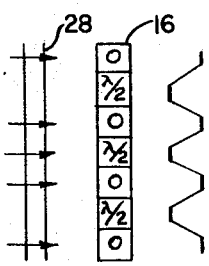
FIG. 5
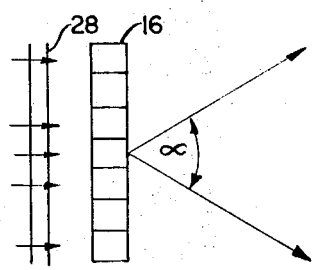
FIG. 6
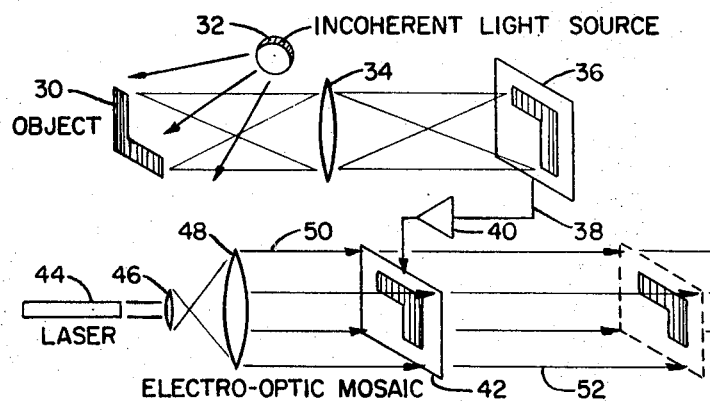
FIG. 7
INVENTOR.
GABOR U. KALMAN
BY
ATTORNEYS.

United States Patent Office 3,517,200
Patented June 23, 1970

3,517,200
IMAGE CONVERSION SYSTEM
Gabor U. Kalman, Bristol, Conn., assignor to Carson Laboratories, Inc., Bristol, Conn., a corporation of Connecticut
Filed Feb. 3, 1967, Ser. No. 613,814
Int. Cl. H01j 3/14, 5/16
U.S. Cl. 250—216                           7 Claims

ABSTRACT OF THE DISCLOSURE

Electro-optic modulating apparatus for light deflection, spatial wave front phase or intensity modulation, and coherency conversion having an array of electro-optic modulators positioned to receive a light input. Electrodes are positioned to selectively vary the electric field across the electro-optic elements to vary the index of refraction of the electro-optic elements to thus change the relative phase of portions of the incoming wave front as it passes through the electro-optic elements.

BACKGROUND OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

Field of the invention

This invention relates to phase modulation apparatus for light deflection, spatical wave front modulation and coherency conversion. More particularly, this invention relates to an array, preferably a mosaic array, of individual electro-optic phase modulators having means for varying the electric field thereacross to vary the index of refraction of the modulators and thus modulate a coherent wave front in accordance with the electric fields imposed across the modulators. As used herein, the term "mosaic array" means any arrangement of elements in a predetermined pattern.

Description of the prior art

Electro-optic elements by means of which light can be electronically modulated are known in the art. Barium titinate (BaTiO$_3$) is a well known example of such an electro-optic element. In the prior devices individual elements have been employed as deflectors or modulators by imposing a single electric field across the element. In the present invention an array of elements is employed in a system with different electric fields across the elements, and system control and operation is accomplished by selection and variation of the fields across the individual elements of the array.

Summary

In the present invention an array, preferably a mosaic array of electro-optic phase modulators such as BaTiO$_3$ elements is employed to produce a light deflector, spatial wave front modulator, and coherency converter by using the individual elements in the array as phase retarding elements for a single wave front input. An input coherent wave front is delivered to the array of electro-optic phase modulators, and the phase modulators are activated to produce phase retardation through changes in index of refraction caused by varying the electric field across the electro-optic elements. The variation of the electric field can be accomplished in accordance with any desired program and in any known manner.

Since phase retardation is accomplished by a change in electric field, beam deflection can be accomplished at relatively high switching speeds. Also, relatively small fiberlike elements can be employed, such as 16 x 10$^{-6}$ in.$^2$ cross sectional area, and relatively low control voltages on the order of zero to 5 volts can be employed to accomplish the desired switching for these small elements. Accurate beam control can be realized because of the ability to regulate the individual electro-optic elements in the array.

Accordingly, one object of the present invention is to provide a novel electro-optic light deflector.

Another object of the present invention is to provide a novel electro-optic converter for converting incoherent images to coherent images.

Another object of the present invention is to provide a novel spatial wave front phase or intensity modulator.

Another object of the present invention is to provide a novel electro-optic light deflector having an array of individual phase retarding elements.

Still another object of the present invention is to provide a novel phased array light deflector having high switching speed, requiring low control voltage, and possessing accurate beam deflection control.

Other objects and advantages will be apparent from the following detailed description and drawings.

Brief description of the drawings

In the drawings, wherein like elements are numbered alike in the several figures:

FIG. 1 is a sectional view of one type of phase retardation element for use in the present invention.

FIG. 2 is a sectional elevational view of another type of phase retardation element for use in the present invention.

FIG. 3 is a sectional view of still another type of phase retardation element for use in the present invention.

FIG. 4 is a schematic representation of a mosaic array of phase retardation elements in accordance with the present invention.

FIG. 5 is a schematic representation of one type of phase retardation in accordance with the present invention.

FIG. 6 is a schematic representation of beam deflection in accordance with the present invention.

FIG. 7 is a schematic showing of structure employing a mosaic array of phase retardation elements for conversion of an incoherent image to a coherent image in accordance with the present invention.

FIG. 8 is a schematic showing of structure employing a mosaic array of phase retardation elements for polarization modulation.

Description of the preferred embodiments

Referring now to FIG. 1, one type of element for use as a phased array electro-optic light deflector in accordance with the present invention is shown. The elements of FIG. 1 include electro-optic wave guide fibers 10, three individual fibers being shown in FIG. 1. Pairs of opposed electrical conductors 12 and 14 run along the upper and lower surfaces of each of the electro-optic wave guide fibers 10 to control light transmission through the electro-optic fibers by varying the index of refraction of the fibers. The electrical conductors 12 and 14 may be, for example, small diameter wires or deposited strips of conducting material. A mosaic array of the fibers 10 with electrodes 12 and 14 can be employed in a manner to be described hereinafter as a phased array electro-optic light modulator for deflection, spatial modulation or coherency conversion.

Referring now to FIG. 2, another electro-optic element suitable for use in the present invention is shown. In the structure of FIG. 2, a block of electro-optic material 16 is employed as the active light modulating element. A plurality of individual electrodes 18 are spaced at equal intervals across the top surface of electro-optic block 16 to serve as part of the structure for varying the electric field across electro-optic block 16. A single electrode 20 butts the bottom surface of electro-optic block 16 and is coextensive with block 16. Electrodes 18 and 20 cooperate to define structure for imposing a variable electric field across block 16 to vary the index of refraction in accordance with the value of the electric power source to which electrodes 18 and 20 are connected. The element shown in FIG. 2 may also be employed in a mosaic array to form the phased array electro-optic light modulator of the present invention.

The element shown in FIG. 2 can be employed as an entire segment of a mosaic array, i.e. as an entire row with the individual electrodes 18 receiving different inputs to effectively segment the individual element into a number of separate elements by establishing different electric fields across different parts of the element. Similarly, a plurality of the elements shown in FIG. 2 could be employed to make up each row of the mosaic array with the individual electrodes 18 in each element then being ordinarily at the same potential for regular operation of the device and being at different potentials to achieve very fine selectivity or tuning. Similarly, it will also be understood that the electrodes 18 of the FIG. 2 element could be formed into a single electrode coextensive with the upper surface of block 16 similar to electrode 20.

Referring now to FIG. 3, another electro-optic element suitable for use in the present invention is shown. The element of FIG. 3 includes electro-optic material block 16 and electrode 20 coextensive with the bottom surface of block 16. However, the upper electrode which cooperates with electrode 20 in imposing an electric field across block 16 is an element of piezoelectric material 22 coextensive with the upper surface of electro-optic block 16. An acoustic wave input to piezoelectric element 22 will vary the electric field across electro-optic blocks 16 and thus vary the index of refraction of block 16. Thus, by using the element of FIG. 3, a phased array electo-optic light modulator in accordance with the present invention is realized which is responsive to a traveling acoustic wave input since the electric field across block 16 will vary as the acoustic input wave travels through piezoelectric element 22.

Referring now to FIG. 4, a mosaic array electro-optic light modulator for deflection, spatial modulation and coherency conversion in accordance with the present invention is shown. Only 3 rows (A, B, C) and 3 columns (D, E, F) are shown for purposes of illustration. The light modulator comprises a mosaic array of identically sized individual electo-optic elements 16 having upper and lower electrodes 18 and 20, respectively. As can best be seen in FIGS. 5 and 6, the individual elements 16 can be of uniform cross section prependicular to the plane of the paper which is the direction of light travel through the elements 16. Upper electrodes 18 are shown as being coextensive with the upper surface of the electro-optic elements 16. However, it will be understood that each row could be composed of the fibers of FIG. 1; or each row could have a single electro-optic element 16 and a single bottom electrode 20 while having a plurality of spaced upper electrodes 18; and it will also be understood that each of the upper electrodes 18 as shown in FIG. 4 could be replaced by a plurality of individual spaced electrodes for each element 16 to provide the capacity for finer variation of the electric field across each block 16.

The mosaic array of FIG. 4 operates as a light modulator by imposing or changing the electric field across the individual elements 16 to thus vary the index of refraction of these electro-optic elements. The changing of the index of refraction of the elements 16 results, of course, in a modulation of light passing through the elements.

By way of example, the array can be used as a beam deflector. Assume that a beam of coherent light is incident on the mosaic array of FIG. 4 from the rear of the paper and in a direction normal to the plane of the paper. Any spatially coherent input can be employed. Also assume for purposes of discussion that the beam travels through the array of FIG. 4 and emerges without deflection perpendicular to the front of the paper when a predetermined bias or null voltage is imposed equally across each of the elements 16; and assume also that an increase in the electric field increases the index of refraction of the elements 16 and a decrease in the electric field reduces the index of refraction of the elements.

Electrical conductors 24 and 26 are connected to each of the electrodes 18 and 20 and the electrodes 24 and 26 are connected to a variable source of voltage (not shown) for imposing variable electric fields across each of the electro-optic elements 16. It will be apparent that electric fields of equal strength and direction can be imposed across each block 16, or electric fields of varying strength and direction can be imposed across selective ones of the elements 16.

Assuming that an increased electric field results in an increased index of refraction, the incoming coherent plane wave will be deflected downwardly toward the bottom of the paper as it passes through elements 16 in the direction from the back of the paper to the front of the paper as the electric field imposed across each of the elements 16 in each of the rows A, B and C is progressively increased to values above the null value to produce a differential from row to row. That is, the field in row B will be higher than the field in row A, and the field in row C will be higher than the field in row B; however, the field across the individual elements in any row will be the same. A similar downward deflection can be achieved by a progressively decreasing field in rows from row C to row A. The phase retardation in any row caused by the varying electric fields can range from fractions of a wavelength of the incoming light to several wavelengths in accordance with the desired deflection. Conversely, the incident beam will be deflected upwardly toward the top of the paper by a progressive reduction of the electric field across each of the elements 16 in each of the rows A, B, and C as a result of the progressively decreasing index of refraction from row to row caused by the progressively decreasing electric field. A similar upward deflection can be achieved by a progressively decreasing field in rows from row A to row C. FIG. 6 shows a schematic representation of a side view of FIG. 4 and shows the incoming plane wave 28 incident normal to the elements 16 being deflected through the angle $\alpha$ in response to uniform changes in the electric field across each of the elements 16.

Since the variations in the electric field across the elements 16 result in changes in the index of refraction of these elements, a mosaic array of elements such as shown in FIG. 4 can also be employed to deflect the incoming light in a plurality of directions and for focusing the incoming light. For example, by maintaining the field across the elements 16 in column D at the null level, and by increasing the field across the elements in columns E and F to progressively larger values, i.e. the field across the elements in column F being larger than the field across the elements in column E, the index of refraction of the matrix is increased from column D to column F so that the incoming beam will be deflected toward the right edge of the paper. It will also be understood that the rightward deflection can be produced by maintaining the elements in column F at the null voltage and progressively decreasing the fields across the elements in columns E and D. Conversely, a leftward deflection of the incoming beam can be accomplished by varying the electric field across the elements to produce a decreasing index of refraction from column F through column D by either progressively increasing the fields from column F through column D or by progressively decreasing the fields from column D through column F.

Deflection can be accomplished in any desired direction by programming the electric fields across the elements 16 to provide a varying index of refraction in the desired direction.

Again bearing in mind that varying the electric field across elements 16 causes a change in the index of refraction of the elements, a mosaic array such as the array of FIG. 4 can also be employed for focusing the incoming wave. Thus, by selective adjustments of the fields across the individual elements 16 in the array, the index of refraction can be made to vary from point to point throughout the array so that focusing of the entire input or parts thereof or other optical effects can be realized.

If each of the elements in the array of FIG. 4 included a plurality of spaced electrodes 18 such as in the FIG. 2 structure, it will be apparent that variations in the index of refraction in each of the individual elements could also be accomplished as well as variations in the index of refraction between the individual elements in the array. Furthermore, it will also be understood that if the elements of the array of FIG. 4 were composed of the elements described in FIG. 3 having the block of piezoelectric material 22, then the variations of index of refraction, and hence beam deflection, could be accomplished by use of acoustical wave inputs rather than electrical inputs through conductors 24 and 26.

Referring now to FIG. 5, a schematic representation is shown of the use of the array of electro-optic elements as a grating. By way of example, if the electric field across alternate elements 16 is set to provide a phase retardation of $\lambda/2$ in these alternate elements ($\lambda$ being equal to the wavelength of the incident wave 28), and with no retardation in the other cells, as indicated, then the array of cells acts effectively as a grating with a period equal to the separation between two of the individual cells 16. The grating will provide both a diffracted and deflected beam, the deflected components of the beam being the diffraction orders above the zero order.

Referring now to FIG. 7, a system is shown wherein the mosaic array of electrode-optic elements of the present invention can be employed in the conversion of an incoherent light image into a spatially modulated coherent light beam. An object 30 is illuminated with incoherent light from the light source 32, and reflections from object 30 are delivered via lens 34 to a mosaic array 36 of photoelectric cells. Known types of scanner tubes could also be employed instead of array 36. The individual cells in photoelectric array 36 can be any known type of photoelectric cells which will provide electrical outputs in response to the incident light inputs in the form of the reflections from object 30. Each of the cells in array 36 is connected via a conductor 38, including an amplifier 40 if desired, to a mosaic array 42 of electrooptic elements such as the array shown in FIG. 4. Each of the photoelectric cells in array 36 is connected to a corresponding electro-optic cell in mosaic array 42 to provide the electrical input for controlling the electric field across the corresponding electro-optic element. Thus, the electric fields imposed across each of the individual elements of array 42 is commensuate with the reflected light inputs to the individual elements of photo-electric array 36.

A coherent light input is provided for electro-optic array 42 from a laser 44 and a lens system including a diverging lens 46 and a collimating lens 48. The laser 44 and lens system provides a coherent input 50 to electrooptic mosaic array 42 for passage through the individual electro-optic elements in the array. The light input 50 is modulated in passing through the electro-optic array 42 in accordance with the electric fields across the individual elements in array 42, and the output 52 from the electro-optic array is then a coherent beam modulated in accordance with the original object 30. It will be apparent that the electrical signals delivered to electro-optic mosaic array 42 from photo-electric array 36 can be selected so that the elements of array 42 pass the input coherent light in accordance with the reflections from object 30 and disperse the remainder of the input 50.

Referring now to FIG. 8, an arrangement is shown for spatial intensity modulation with the array of the present invention. Input wavefront 28 is delivered to the array of elements 16 as polarized light with the direction of polarization being at an angle to the optic axis of the elements 16. An analyzer 54 is provided at the output side of the array. Changes in the field across any particular elements 16 will cause rotation of the plane of polarization of the light passing through that element. The amount of light emerging from that element and passing through analyzer 54 will vary in Kerr cell fashion as the plane of polarization is changed. Thus, the light passing through each element 16 can be varied according to any desired program to produce an intensity modulated output for the entire array.

Also, by omitting analyzer 54, the output from the array of elements 16 becomes a modulated output with portions of the output wavefront being modulated in polarization direction in accordance with the inputs to the individual elements 16 of the array. In this way a significant new tool, i.e. a polarization modulated beam, can be produced for uses such as holography.

While preferred embodiments have been shown and described, various modifications and substitutions may be made without departing from the spirit and scope of this invention. Accordingly, it is to be understood that this invention has been described by way of illustration rather than limitation.

What is claimed is:
1. Light modulating apparatus including:
   conversion means for receiving an incoherent light image and generating electrical outputs in response to a condition of the incoherent light image;
   an array of electrooptic elements;
   modulating means associated with each of said electrooptic elements for controlling the index of refraction of the electrooptic elements to thereby modulate light transmission through said array;
   means connecting each of said modulating means to receive outputs from said conversion means to vary the light transmission through said array commensurate with inputs to said conversion means; and
   means for generating coherent light, said coherent light being directed to said array of electrooptic elements for modulation in accordance with outputs from said conversion means to modulate said coherent light to produce a coherent light image commensurate with the incoherent light image.

2. Light modulating apparatus as in claim 1 wherein said modulating means includes electric field means for imposing electric fields across each of said electrooptic elements.

3. Light modulating apparatus as in claim 2 wherein said conversion means includes a plurality of photoelectric cells, each of said photoelectric cells being connected to the electric field means of a corresponding electrooptic element.

4. Light modulating apparatus as in claim 1 wherein said array of electrooptic elements is a mosaic array; and wherein said means for generating coherent light includes laser means.

5. The method of converting an image bearing incoherent light signal to an image bearing coherent light signal, including the steps of:
   generating an image bearing incoherent light signal;
   converting said incoherent light signal to electrical signals commensurate with the image in said incoherent light signal;
   generating a coherent light signal;
   delivering said coherent light signal to a mosaic array of electrooptic elements whose index of refraction varies with the ampiltude of the electrical signals; and
   delivering said electric signals to said mosaic array to modulate said coherent light signal to produce a coherent light signal having an image commensurate with the incoherent light image.

6. The method of converting an image bearing incoherent light signal to an image bearing coherent light signal as in claim 5 wherein said step of generating said electrical signals includes delivering said incoherent light signal to an array of photoelectric elements.

7. The method of converting an image bearing incoherent light signal to an image bearing coherent light signal as in claim 6 wherein said step of delivering said electric signals to said mosaic array includes delivering electric signals from said photoelectric cells to corresponding electro-optic elements in said array of electro-optic elements.

References Cited

UNITED STATES PATENTS

| | | | |
|---|---|---|---|
| 3,188,475 | 6/1965 | Miller | 250—208 |
| 3,228,290 | 1/1966 | Davisson et al. | 350—150 |
| 3,312,957 | 4/1967 | Fleisher et al. | 350—150 |
| 3,331,651 | 7/1967 | Sterzer | 350—150 |
| 3,330,957 | 7/1967 | Runnels | 350—150 |
| 3,365,579 | 1/1968 | Emshwiller | 250—216 |
| 3,365,581 | 1/1968 | Tell et al. | 350—150 |

OTHER REFERENCES

Ames: IBM Technical Disclosure Bulletin, vol. 3, No. 3, August 1960, p. 62.

Duane: Western Electric Technical Digest, No. 3, July 1966, pp. 29–30.

Texas Instruments, Bulletin No. DLA–B224, January 1966.

Garwin: IBM Technical Disclosure Bulletin, vol. 8, No. 11, April 1966, pp. 1555–56.

Gerritsen: RCA Technical Notes, "Projection of Black and White Pictures Using Laser Beams," No. 720, June 1967.

RALPH G. NILSON, Primary Examiner

C. M. LEEDOM, Assistant Examiner

U.S. Cl. X.R.

178—7.3; 315—169; 350—150